United States Patent
Tschabold (10) Patent No.: US 12,025,479 B2
(45) Date of Patent: Jul. 2, 2024

(54) MONITORING A DISTURBING VARIABLE OF A MEASURING DEVICE SYSTEM BY MONITORING AN ERROR VELOCITY OF THE MEASURING DEVICE SYSTEM

(71) Applicant: Endress+Hauser Flowtec AG, Reinach (CH)

(72) Inventor: Peter Tschabold, Breitenbach (CH)

(73) Assignee: Endress+Hauser Flowtec AG, Reinach (CH)

(*) Notice: Subject to any disclaimer, the term of this patent is extended or adjusted under 35 U.S.C. 154(b) by 79 days.

(21) Appl. No.: 17/754,605

(22) PCT Filed: Sep. 18, 2020

(86) PCT No.: PCT/EP2020/076172
§ 371 (c)(1),
(2) Date: Apr. 7, 2022

(87) PCT Pub. No.: WO2021/069192
PCT Pub. Date: Apr. 15, 2021

(65) Prior Publication Data
US 2022/0373371 A1 Nov. 24, 2022

(30) Foreign Application Priority Data

Oct. 7, 2019 (DE) .................... 10 2019 126 883.4

(51) Int. Cl.
*G01F 1/50* (2006.01)
*G01F 1/84* (2006.01)
*G01F 25/10* (2022.01)

(52) U.S. Cl.
CPC ............... *G01F 1/50* (2013.01); *G01F 1/84* (2013.01); *G01F 25/10* (2022.01)

(58) Field of Classification Search
CPC .. G01F 1/76–90; G01F 1/8436; G01F 1/8427; G01F 1/50
See application file for complete search history.

(56) References Cited

U.S. PATENT DOCUMENTS

| 4,028,939 A | * | 6/1977 | Fletcher | ................ G01P 5/02 |
| | | | | 73/170.15 |
| 5,497,665 A | * | 3/1996 | Cage | .................. G01F 1/8413 |
| | | | | 73/861.357 |

(Continued)

FOREIGN PATENT DOCUMENTS

| CN | 101750124 A | 6/2010 |
| CN | 102016519 A | 4/2011 |

(Continued)

*Primary Examiner* — Tran M. Tran
(74) *Attorney, Agent, or Firm* — Mark A. Logan; Endress+Hauser (USA) Holding, Inc.

(57) ABSTRACT

The method comprises producing a measurement signal (s1) having a signal parameter, followed with a temporal change ($\Delta x1/\Delta t$; $\Delta x1'/\Delta t$) of a primary measured variable (x1) and a temporal change ($\Delta y1/\Delta t$) of a disturbing variable ($\Delta 1$), and producing a measurement signal (s2) having a signal parameter, followed by a temporal change ($\Delta x2/\Delta t$; $\Delta x2'/\Delta t$) of a primary measured variable (x2). The method comprises ascertaining measured values ($X_I$) of first type representing the primary measured variable (x1) or a secondary measured variable (f(x1) $\Delta x1'$) of measured values ($X_{II}$) of second type representing the primary measured variable (x2) or a secondary measured variable (f(x2) $\Delta x2'$). The method comprises using measured values ($X_I$) of first type and measured values ($X_{II}$) of second type for ascertaining an error characterizing number (Err) representing a velocity error ($\Delta X_I/\Delta X_{II}$) caused by a change of the disturbing variable (y1).

20 Claims, 3 Drawing Sheets

(56) References Cited

U.S. PATENT DOCUMENTS

| | | | | |
|---|---|---|---|---|
| 5,544,532 | A * | 8/1996 | Brown | G01F 1/58 |
| | | | | 73/861.12 |
| 5,905,206 | A * | 5/1999 | Herwig | G01F 1/60 |
| | | | | 73/861.12 |
| 5,926,096 | A * | 7/1999 | Mattar | G01F 1/8413 |
| | | | | 340/606 |
| 6,345,536 | B1 * | 2/2002 | Morrison | G01F 1/50 |
| | | | | 73/861.04 |
| 6,556,931 | B1 * | 4/2003 | Hays | G01F 1/8436 |
| | | | | 702/100 |
| 6,895,813 | B2 | 5/2005 | Mattar | |
| 6,962,164 | B2 * | 11/2005 | Lull | G05B 13/042 |
| | | | | 700/282 |
| 7,072,775 | B2 * | 7/2006 | Hemp | G01F 1/8436 |
| | | | | 702/33 |
| 7,207,229 | B2 * | 4/2007 | Mattar | G01F 1/74 |
| | | | | 73/861.354 |
| 7,273,063 | B2 * | 9/2007 | Lull | G01F 1/696 |
| | | | | 137/12 |
| 7,360,453 | B2 * | 4/2008 | Rieder | G01F 1/8431 |
| | | | | 73/861.357 |
| 7,403,862 | B2 * | 7/2008 | Budmiger | G01F 1/60 |
| | | | | 702/50 |
| 7,406,878 | B2 * | 8/2008 | Rieder | G01F 1/8472 |
| | | | | 73/861.355 |
| 7,826,986 | B2 * | 11/2010 | McDonald | G01F 5/00 |
| | | | | 700/282 |
| 7,836,779 | B2 * | 11/2010 | Rasmussen | G01F 1/588 |
| | | | | 73/861.12 |
| 7,882,749 | B2 * | 2/2011 | Kappertz | G01F 1/60 |
| | | | | 73/861.12 |
| 7,954,388 | B2 * | 6/2011 | Kuttler | G01F 1/8436 |
| | | | | 73/861.356 |
| 7,966,895 | B2 * | 6/2011 | Kuttler | G01F 1/849 |
| | | | | 73/861.356 |
| 8,126,661 | B2 * | 2/2012 | Henry | G01F 1/74 |
| | | | | 702/45 |
| 8,650,929 | B2 * | 2/2014 | Pankratz | G01F 1/8436 |
| | | | | 73/1.34 |
| 8,751,180 | B2 * | 6/2014 | Lull | G01F 1/86 |
| | | | | 702/100 |
| 8,855,958 | B2 * | 10/2014 | Wang | G01F 1/8436 |
| | | | | 702/50 |
| 8,863,589 | B2 * | 10/2014 | Bitto | G01F 15/14 |
| | | | | 73/861.355 |
| 8,950,274 | B2 * | 2/2015 | Scherrer | G01F 25/10 |
| | | | | 702/45 |
| 9,234,780 | B2 * | 1/2016 | Henry | G01F 1/8481 |
| 9,372,107 | B2 * | 6/2016 | Kirst | G01F 1/8436 |
| 9,383,241 | B2 * | 7/2016 | Weinstein | G01F 1/8436 |
| 9,395,236 | B2 * | 7/2016 | McAnally | G01N 9/002 |
| 9,400,203 | B2 * | 7/2016 | Patten | G01F 25/10 |
| 9,513,148 | B2 * | 12/2016 | Hogendoorn | G01F 1/44 |
| 9,557,744 | B2 * | 1/2017 | Ding | G05D 7/0635 |
| 9,970,795 | B2 * | 5/2018 | Hunter | G01F 1/58 |
| 10,031,005 | B2 * | 7/2018 | Ding | G01F 15/046 |
| 10,309,866 | B2 * | 6/2019 | Zhu | G01M 5/0058 |
| 10,606,285 | B2 * | 3/2020 | Ding | G01F 25/15 |
| 10,620,027 | B2 * | 4/2020 | Schollenberger | G01F 1/8431 |
| 10,663,337 | B2 * | 5/2020 | Penley | G01F 15/002 |
| 11,060,897 | B2 * | 7/2021 | Dasaka | G01C 21/18 |
| 11,326,919 | B2 * | 5/2022 | Zhu | G01N 11/16 |
| 11,353,352 | B2 * | 6/2022 | Somani | G01F 1/48 |
| 11,486,752 | B2 * | 11/2022 | Patten | G01F 1/8436 |
| 11,555,460 | B2 * | 1/2023 | Poloni | F02M 26/47 |
| 11,852,517 | B2 * | 12/2023 | Cunningham | G01F 1/8409 |
| 2007/0084298 | A1 | 4/2007 | Rieder et al. | |
| 2008/0066521 | A1 * | 3/2008 | Logue | G01F 1/849 |
| | | | | 73/1.34 |
| 2008/0250866 | A1 * | 10/2008 | Tschabold | G01F 1/60 |
| | | | | 73/861.11 |
| 2011/0161018 | A1 | 6/2011 | Kumar et al. | |
| 2011/0186157 | A1 * | 8/2011 | Paul | G05D 7/0694 |
| | | | | 137/565.01 |
| 2012/0042732 | A1 | 2/2012 | Zhu et al. | |
| 2014/0190579 | A1 * | 7/2014 | Ding | G01F 15/005 |
| | | | | 137/487 |
| 2018/0045545 | A1 * | 2/2018 | Fink | G01F 1/586 |
| 2022/0333971 | A1 * | 10/2022 | Rieder | G01F 25/10 |
| 2023/0028225 | A1 * | 1/2023 | Schäfer | G01F 15/046 |
| 2023/0051187 | A1 * | 2/2023 | Buttler | G01F 15/024 |

FOREIGN PATENT DOCUMENTS

| | | |
|---|---|---|
| CN | 102667420 A | 9/2012 |
| CN | 103582876 A | 2/2014 |
| CN | 104380219 A | 2/2015 |
| CN | 105283748 A | 1/2016 |
| CN | 109562213 A | 4/2019 |
| DE | 102011076838 A1 | 12/2012 |
| DE | 102012012252 A1 | 12/2013 |
| DE | 102013106157 A1 | 12/2014 |
| JP | 2010169657 A | 8/2010 |
| RU | 2157511 C1 | 10/2000 |
| WO | 2009134268 A1 | 11/2009 |
| WO | 2016176224 A1 | 11/2016 |
| WO | 2018083453 A1 | 5/2018 |

* cited by examiner

MONITORING A DISTURBING VARIABLE OF A MEASURING DEVICE SYSTEM BY MONITORING AN ERROR VELOCITY OF THE MEASURING DEVICE SYSTEM

CROSS-REFERENCE TO RELATED APPLICATIONS

The present application is related to and claims the priority benefit of German Patent Application No. 10 2019 126 883.4, filed on Oct. 7, 2019, and International Patent Application No. PCT/EP2020/076172, filed on Sep. 18, 2020, the entire contents of which are incorporated herein by reference.

TECHNICAL FIELD

The invention relates to a method for monitoring a measuring device system formed by means of a first measuring device and by means of a second measuring device, especially a method for checking an ability of the measuring device system to function and/or for detecting a disturbance of the measuring device system.

BACKGROUND

In industrial measurements technology, often applied for ascertaining one or more measured variables, for example, mass flow and/or density of a measured substance flowing in a process line, for example, a pipeline, are measuring device systems, or measuring arrangements, formed by means of two or more (single-)measuring devices. Examples of such a measuring device system formed by means of a first measuring device and by means of at least a second measuring device are known from, among others, US-A 2007/0084298, US-A 2011/0161018, US-A 2012/0042732, WO-A 2009/134268, WO-A 2016/176224 and WO-A 2018/083453.

In the case of such a measuring device system, the first measuring device serves for producing a, typically electrical, first measurement signal, which has, in turn, at least a first signal parameter, for example, an amplitude, a frequency or a phase angle, which follows with a temporal change a temporal change of a first primary measured variable, as well as for ascertaining measured values of first type based at least on the first signal parameter of the first measurement signal and representing the first primary measured variable or a first secondary measured variable dependent thereon and the second measuring device serves for producing a, typically electrical, second measurement signal, which likewise has at least a first signal parameter, which follows with a temporal change a temporal change of a, in given cases, also dependent on the first primary measured variable, second primary measured variable, as well as for ascertaining measured values of second type based at least on the first signal parameter of the second measurement signal and representing the second primary measured variable or a second secondary measured variable dependent thereon. For registering and converting the primary measured variables into the measurement signals representing them, each of the measuring devices includes a corresponding measuring transducer, which, in turn, is electrically connected with a measuring device-electronics of the measuring device correspondingly evaluating the measurement signal delivered to it. The measuring transducer can be connected, for example, for series flow or for parallel flow. In the case of the measuring device systems described in US-A 2007/0084298, US-A 2011/0161018, US-A 2012/0042732, and WO-A 2009/134268, for example, the first measuring device is, in each case, adapted to measure as first primary measured variable a mass flow and/or as a first secondary measured variable a volume flow of the fluid flowing through the measuring device and the second measuring device is adapted to measure as a second primary measured variable a pressure and/or a pressure difference within a fluid flowing through the measuring device, for example, also a pressure drop across the first measuring device, and/or as a second secondary measured variable a volume flow of the fluid. The first measuring device can be, for example, a conventional Coriolis-mass flow measuring device, or a Coriolis-mass flow/-density measuring device and the second measuring device can be, for example, a pressure difference-volume flow rate measuring device. Moreover, such a measuring device system can also be so embodied that, as well as also described in US-A 2007/0084298 and WO-A 2009/134268, at least one of its first and second measuring devices generates the measurement signal by means of the two measuring transducers, or that the measuring transducer of one of the two measuring device serves, at least partially, also as a component of the measuring transducer of the other measuring device.

As discussed in, among others, WO-A 2009/134268, the above described measured values of first and second type can, among other purposes, also be used, in order, based on a difference between the nominally largely equal measured values, to monitor the measuring device system concerning whether, or to what extent, a disturbance of the measuring device system is present, for example, a disturbance in the form of a deposit on an inner wall of one or more tubes involved in the measuring, in such a manner that due to the presence of the disturbance, on the one hand, and an increased (cross-)sensitivity of at least one of the measurement signals, or of its at least one signal parameter, to a corresponding disturbing variable, on the other hand, the measured values of first type and/or the measured values of second type have an unacceptably high measurement error. Another correspondingly to be diagnosed disturbance of such a measuring device system can, for example, also be present, when the measuring device system is subjected to strong electrical and/or magnetic fields, for instance, as a result of a near field located, high electrical DC current installation or a strong magnet. As a result of such a disturbance, the temporal change of at least one of the signal parameters of the first and second measurement signals can, at least partially, be attributed to such a disturbance, or its temporal change, such that, consequently, measured values ascertained therewith can be corrupted to a quite considerable degree.

Investigations of measuring device systems of the above described type have, however, shown, furthermore, that in the case of application of such a method for diagnosis of disturbances of measuring device systems of the type being discussed, or for monitoring such measuring device systems, particularly due to the typically different measurement accuracies of the first and second measuring devices, on the one hand, and the typically different sensitivities of the measurement signals delivered by the measuring devices to such disturbances, on the other hand, a threshold for detection of the disturbances can lie quite significantly above the actually accepted measure of tolerance for measurement errors; this, especially, in such a manner that the disturbance can only be detected after it has become relatively large and/or, for instance, in the case of measured values totaled over a longer measuring period, has already lasted a long time.

SUMMARY

Taking the above described matters into consideration, an object of the invention is so to improve measuring device systems of the above described type that disturbances possibly occurring therein, or corresponding corruption of their measured values, can be detected early and reliably.

For achieving the object, the invention resides in a method for monitoring a measuring device system formed by means of a first measuring device and by means of a second measuring device, and serving, for example, for registering measured variables of a fluid flowing in a pipeline, for example, a method for checking an ability of the measuring device system to function and/or for detecting a disturbance of the measuring device system, which method comprises steps as follows:
- producing a, for example, electrical, first measurement signal by means of the first measuring device, in such a manner that the measurement signal has at least a first signal parameter, for example, an amplitude, a frequency or a phase angle, which follows with a temporal change both a temporal change of a first primary measured variable as well as also a temporal change of a disturbing variable independent of the first measured variable, for example, a temporal change of a disturbing variable degrading an ability of the measuring device system to function and/or effecting a disturbance of the measuring device system;
- producing a, for example, electrical, second measurement signal by means of the second measuring device, in such a manner that the measurement signal has at least a first signal parameter, for example, an amplitude, a frequency or a phase angle, which follows with a temporal change a temporal change of a second primary measured variable, for example, a second primary measured variable dependent on the first primary measured variable and/or independent of the disturbing variable;
- ascertaining measured values of first type representing the first primary measured variable or a first secondary measured variable dependent thereon and based at least on the first signal parameter of the first measurement signal;
- ascertaining measured values of second type representing the second primary measured variable or a second secondary measured variable dependent thereon and based at least on the first signal parameter of the second measurement signal;
- using both measured values of first type as well as also measured values of second type for ascertaining an error characterizing number, wherein the error characterizing number represents, for example, quantifies, a velocity error of the measuring device system caused by a change of the disturbing variable, for example, an increased velocity error and/or a velocity error classified as critical, namely a velocity error in the form of a difference between a, for example, instantaneous, or average, rate of change of the measured values of first type and a, for example, instantaneous, or average, rate of change of the measured values of second type.

In a first embodiment of the invention, it is, furthermore, provided that a report is produced, which indicates, as a function of the ascertained error characterizing number, at least qualitatively, an extent of the disturbing variable, and which is declared, for example, as an alarm.

In a second embodiment of the invention, it is, furthermore, provided that the measured values of first type and/or the measured values of second type are output as qualified measured values of the measuring device system as a function of the ascertained error characterizing number.

In a third embodiment of the invention, it is, furthermore, provided that output at least of measured values of first type is prevented as qualified measured values of the measuring device system as a function of the ascertained error characterizing number.

In a fourth embodiment of the invention, it is, furthermore, provided that the ascertaining of the error characterizing number includes a, for example, recurring, calculating of at least one characterizing number value quantifying the error characterizing number, for example, a calculating of a plurality of characterizing number values following one after another in time, for example, in such a manner that an increasing error characterizing number represents an increasing velocity error. Developing this embodiment of the invention further, it is, additionally, provided that at least one characterizing number value of the error characterizing number is compared with a predetermined threshold value, wherein the threshold value represents, for example, quantifies, a maximum allowable velocity error of the measuring device system, and the report is produced, when the characterizing number value exceeds, or has exceeded, the threshold value. Developing this embodiment of the invention further, it is, additionally, provided that the measured values of first type and/or measured values of second type are output as qualified measured values of the measuring device system, when the at least one characterizing number value has not exceeded the threshold value, and/or output at least of measured values of first type as qualified measured values of the measuring device system is prevented, when the at least one characterizing number value has exceeded the threshold value.

In a fifth embodiment of the invention, it is, furthermore, provided that the ascertaining of the error characterizing number, for example, the calculating of one or more characterizing number values quantifying the error characterizing number, includes ascertaining a measured value difference of first type, namely a difference between two measured values of first type ascertained following one after another in time over a predetermined time interval, and ascertaining a measured value difference of second type, namely a difference between two measured values of second type ascertained following one after another in time over said time interval. Developing this embodiment of the invention further, it is, additionally, provided that the ascertaining of the error characterizing number includes ascertaining a quotient of the measured values-difference of first type and the measured values-difference of second type.

In a sixth embodiment of the invention, it is, furthermore, provided that the ascertaining of the error characterizing number includes ascertaining a measured value difference of first type, namely a difference between two measured values of first type ascertained following one after another in time over a predetermined time interval, and ascertaining a measured value difference of second type, namely a difference between two measured values of second type ascertained following one after another in time over said time interval, as well as ascertaining both a rate of change of the measured values of first type from the measured value difference of first type and the predetermined time interval as well as also a rate of change of the measured values of second type from the measured value difference of first type and the predetermined time interval. Developing this embodiment of the invention further, it is, additionally, provided that the ascertaining of the error characterizing number includes ascertaining a quotient of the rate of change of the measured values of first type and the rate of change of the measured values of second type.

In a seventh embodiment of the invention, it is, furthermore, provided that the first measuring device is a Coriolis mass flow measuring device, for example, a Coriolis mass flow/density measuring device.

In an eighth embodiment of the invention, it is, furthermore, provided that the first measuring device is adapted to measure mass flow and/or a volume flow, for example, also density, of a fluid flowing through the measuring device.

In a ninth embodiment of the invention, it is, furthermore, provided that the second measuring device is a pressure difference-measuring device.

In a tenth embodiment of the invention, it is, furthermore, provided that the second measuring device is adapted to measure a pressure difference within a fluid flowing through the measuring device and/or a volume flow of the fluid.

In an eleventh embodiment of the invention, it is, furthermore, provided that the first primary measured variable is a mass flow of a fluid flowing through the first measuring device, for example, a fluid flowing through both the first measuring device as well as also the second measuring device.

In a twelfth embodiment of the invention, it is, furthermore, provided that the first secondary measured variable is a volume flow of a fluid flowing through the first measuring device, for example, a fluid flowing through both the first measuring device as well as also the second measuring device.

In a thirteenth embodiment of the invention, it is, furthermore, provided that the second primary measured variable is a pressure difference within a fluid flowing through the second measuring device, for example, a fluid flowing through both the second measuring device as well as also the first measuring device.

In a fourteenth embodiment of the invention, it is, furthermore, provided that the second secondary measured variable is a volume flow of a fluid flowing through the second measuring device, for example, a fluid flowing through both the second measuring device as well as also the first measuring device.

In a fifteenth embodiment of the invention, it is, furthermore, provided that the disturbing variable is a magnetic flux, or a magnetic flux density, of a magnetic field within the first measuring device, for example, a magnetic field closing outside of the first measuring device, or a magnetic field caused by a magnet positioned outside of the first measuring device.

In a sixteenth embodiment of the invention, it is, furthermore, provided that at least the first measurement signal has at least a second signal parameter, which follows with a temporal change a temporal change of a third primary measured variable, for example, a third primary measured variable independent of at least one of the first and second primary measured variables and/or the disturbing variable, for example, a third primary measured variable in the form of a density of a fluid flowing through the first measuring device, or through both the first measuring device as well as also the second measuring device. Developing this embodiment of the invention further, it is, additionally, provided to use the first measurement signal also for ascertaining measured values of third type representing the third primary measured variable. The measured values of third type can be used, additionally, for ascertaining the measured values of first type and/or for ascertaining the measured values of second type.

In a seventeenth embodiment of the invention, the first measuring device is also used for producing a, for example, electrical, third measurement signal, which has at least a first signal parameter, for example, an amplitude, a frequency or a phase angle, which follows with a temporal change both the temporal change of the first primary measured variable as well as also the temporal change of the disturbing variable, and measured values of first type are ascertained based also on the first signal parameter of the third measurement signal.

A basic idea of the invention is to detect a possible disturbance of the measuring device system by detecting and correspondingly evaluating a significant, in given cases, also abrupt, change of the first signal parameter of the first measurement signal, or the measured values of first type won therefrom, happening with the arrival, or disappearance, of the disturbance; this, especially, in such a manner that the change of the measured values of first type effected by the disturbance is evaluated relative to a simultaneous, typically very much smaller, or negligible, change of the measured values of second type caused by the same disturbance, namely is converted into an error characterizing number at least qualitatively representing, in given cases, however, also correspondingly quantifying, the (error-)state of the measuring device system.

The invention as well as advantageous embodiments thereof will now be explained in greater detail based on examples of embodiments shown in the figures of the drawing. Equal, or equally acting or equally functioning, parts are provided in all figures with equal reference characters; when perspicuity requires or it otherwise appears sensible, reference characters already shown in earlier figures are omitted in subsequent figures. Other advantageous embodiments or additional developments, especially also combinations of, firstly, only individually explained aspects of the invention, result, furthermore, from the figures of the drawing and/or from claims per se.

DETAILED DESCRIPTION

Shown schematically in FIGS. 1a, 1b, 1c and 1d are measuring device systems M1+M2 each formed by means of a first measuring device M1 and a second measuring device M2 for ascertaining measured values for two or more measured variables of a measured substance flowing in a process line, for example, a pipeline. In a measuring device system M1+M2, the first measuring device M1 is used for producing a, for example, electrical, first measurement signal s1, which, in turn, has at least one signal parameter, for example, an amplitude, a frequency or a phase angle, which follows with a temporal change a temporal change of a first primary measured variable x1, for example, a mass flow of the measured substance flowing in the measuring device system M1+M2. Moreover, the second measuring device is used, in order to produce a, for example, electrical, second measurement signal s2, which likewise has at least one signal parameter, which follows with a temporal change a temporal change of a second primary measured variable x2, in given cases, a second primary measured variable dependent on the first primary measured variable x1, for example, a second primary measured variable in the form of a pressure difference of the measured substance flowing in the measuring device system M1+M2, and in order to ascertain, based at least on the first signal parameter of the second measurement signal s2, measured values $X_{II}$ of second type, for example, digital measured values, representing the second primary measured variable x2 or a second secondary measured variable x2' (f(x2)→x2') dependent thereon, for example, a volume flow of the measured substance flowing in the measuring device system M1+M2. Especially, the measuring device M1 can, furthermore, be adapted, or used, to measure as secondary measured variable x1' the primary measured variable x2 measured by the measuring device M2, and/or the measuring device M2 can be adapted, or used, to measure as secondary measured variable x2' the primary measured variable x1 measured by the measuring device M1; this, for example, also in such a manner that the measured values $X_I$ of first type represent the same measured variable as the measured values $X_{II}$ of second type. Alternatively or supplementally, the measuring device M2 can, coordinated with the measuring device M1, furthermore, be so selected that the primary measured variable x2 registered therewith depends on the primary measured variable x1. In an additional embodiment of the invention, the first measuring device M1 is, furthermore, adapted to measure as primary measured variable x1 mass flow m;˙1 (m;˙1=dM/dt→x1) and/or as a secondary measured variable x1' a volume flow V;˙1 (V;˙1=dV/dt=m;˙/ρ→x1') of the measured substance flowing through the measuring device M1, in given cases, also through the measuring device M2. Additionally, the measuring device M2 is adapted to measure as primary measured variable x2 a pressure p and/or a pressure difference Δp2 (Δp→x2) within the measured substance flowing through the measuring device M2, in given cases, also through the measuring device M1, and/or as secondary measured variable x2' a volume flow v;˙2 (v;˙2=dV/dt=f(√Δp)→x2') of the measured substance. The measuring device M1 can, accordingly, be, for example, a Coriolis-flow-measuring device or, for example, also a magnetically inductive flow-measuring device and the measuring device M2 can be, for example, a pressure difference-flow-measuring device or a vortex-flow-measuring device.

Figure 1A:
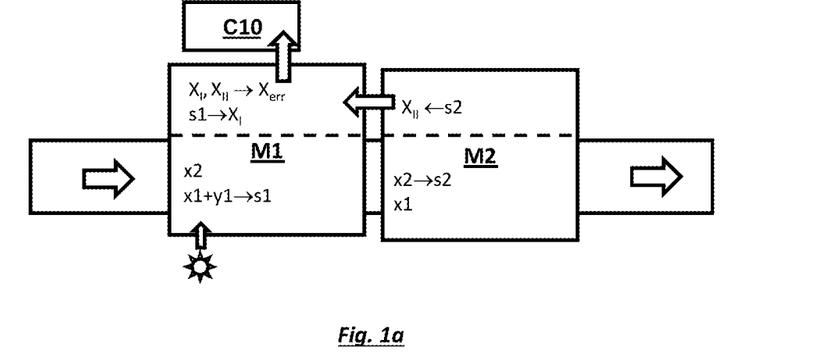
FIGS. 1a, 1b, 1c, 1d show different variants of a measuring device system suitable for the present disclosure.
Figure 1B:
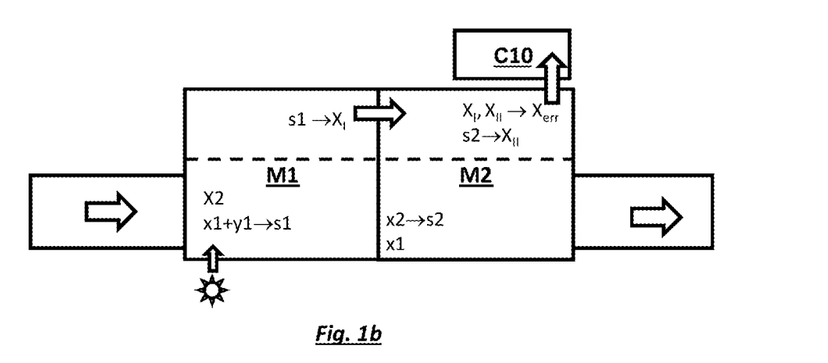
Figure 1C:
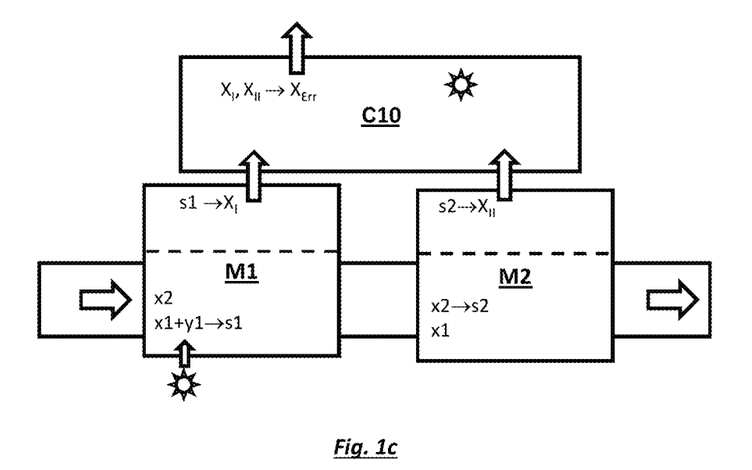
Figure 1D:
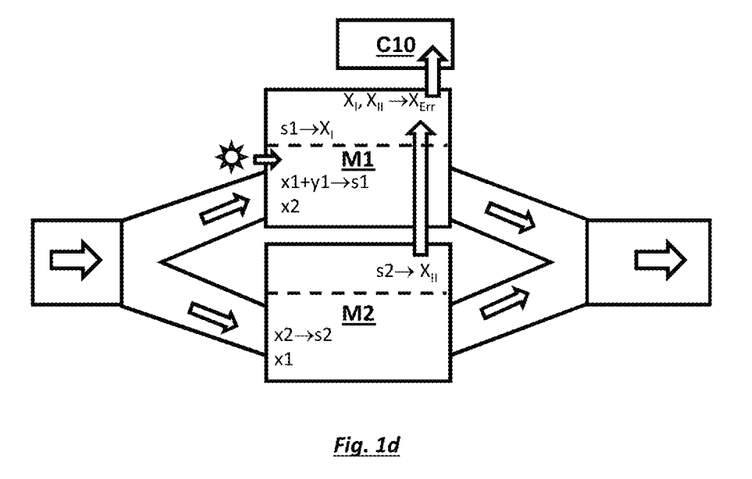

For registering the primary measured variables and converting the measured variables into the measurement signals s1 (x1→s1), s2 (x2→s2) representing them, each of the measuring devices M1, M2 includes, integrated into the course of the process line, a measuring transducer, which—, as indicated in FIGS. 1a,1b,1c—is adapted to be flowed through by measured substance during operation of the measuring device system M1+M2. Furthermore, each of the measuring devices M1, M2 includes, electrically connected with its measuring transducer, a measuring device-electronics, which is, in turn, adapted to receive and correspondingly to evaluate the delivered measurement signals s1, s2, namely based thereon to ascertain the measured values $X_I$ of first type and measured values $X_{II}$ of second type, (s1→$X_I$, s2→$X_{II}$). In an additional embodiment of the invention, it is, furthermore, provided that at least the measurement signal s1 of the measuring device M1 has at least a second signal parameter (different from its first signal parameters), which follows with a temporal change a temporal change of a third primary measured variable x3, for example, a third primary measured variable independent of at least one of the primary measured variables x1, x2 and/or of the disturbing variable y1; this, especially, in such a manner that the measurement signal s1 can also be applied for ascertaining or calculating measured values $X_{III}$ of third type representing the third primary measured variable x3. Particularly for the above described case, in which the measuring device M1 is embodied as a Coriolis-mass flow-measuring device, the second signal parameter can be a frequency, for example, and the third primary measured variable x3 can be, for example, a density (ρ→x3) of the fluid flowing through the measuring device M1, in given cases, also the measuring device M2. Alternatively or supplementally, measured values $X_{III}$ of third type can, additionally, also be used for ascertaining measured values $X_I$ of first type and/or measured values $X_{II}$ of second type, for example, in order to convert a mass flow measured as a measured variable x1 into a volume flow (v;˙1=m;˙1/ρ→$X_I$) or a volume flow measured as a measured variable x2 into a mass flow (m;˙2=V;˙2·ρ→$X_{II}$). Particularly for this case, the measuring device M1 can, furthermore, also be adapted, or used, to generate a, for example, likewise electrical and/or measurement signal s1 type-equal, third measurement signal s3, which has at least one signal parameter, for example, an amplitude, a frequency or a phase angle, which follows with a temporal change both the above referenced temporal change Δx1/Δt (Δx1'/Δt) of the primary measured variable x1 as well as also the above described temporal change Δy1/Δt of the disturbing variable y1. The signal parameter of the measurement signal s3 can in supplementation, of the signal parameter of the measurement signal s1, furthermore, be used to ascertain the measured values $X_I$ of first type.

As shown schematically in FIGS. 1a,1b,1c, the first and second measuring devices M1, M2, e.g. their measuring transducers, can be connected for series flow, for example, in such a manner that the same mass flow is present in both measuring devices M1, M2, e.g. both measuring transducers. The measuring transducers, or the measuring devices M1, M2 formed therewith, can, such as however, shown in FIG. 1d, also be connected for parallel flow, for example, in such a manner that the pressure drop in the measured substance flowing through the two measuring devices M1, M2, and the two measuring transducers is equal. Moreover, the measuring device system M1+M2 can also be formed in such a manner that type, construction and/or arrangement of the measuring devices M1, M2, and their measuring transducers, additionally, correspond, for example, also to measuring device systems known from US-A 2007/0084298, US-A 2011/0161018, US-A 2012/0042732, WO-A 2009/134268 or WO-A 2016/176224; this, for example, also in such a manner that, such as provided, among others, also in US-A 2007/0084298 or WO-A 2009/134268, at least one of the measuring devices M1, M2 generates its measurement signal s1,s2 by means of the two measuring transducers, or the measuring transducer of one of the two measuring devices M1 or M2, at least partially, also serves as a component of the measuring transducer of the other measuring device M1,M2, for example, the measured variable x2 measured by means of the measuring device M2 corresponds to a pressure drop across the measuring device M1, e.g. its measuring transducer (Δp→x2). Alternatively or supplementally, the measuring device system M1+M2 can, furthermore, be signal-coupled with a superordinated, measurement data registering and evaluating, computing unit C10, for example, a programmable logic controller (PLC), a flow computer or a work station (PC),—, for example, by means of data link and/or by means of radio connection—and the measuring device system can additionally, be adapted to send to the computer unit C10, at least at times, measured values of first and/or second type.

Figure 2:
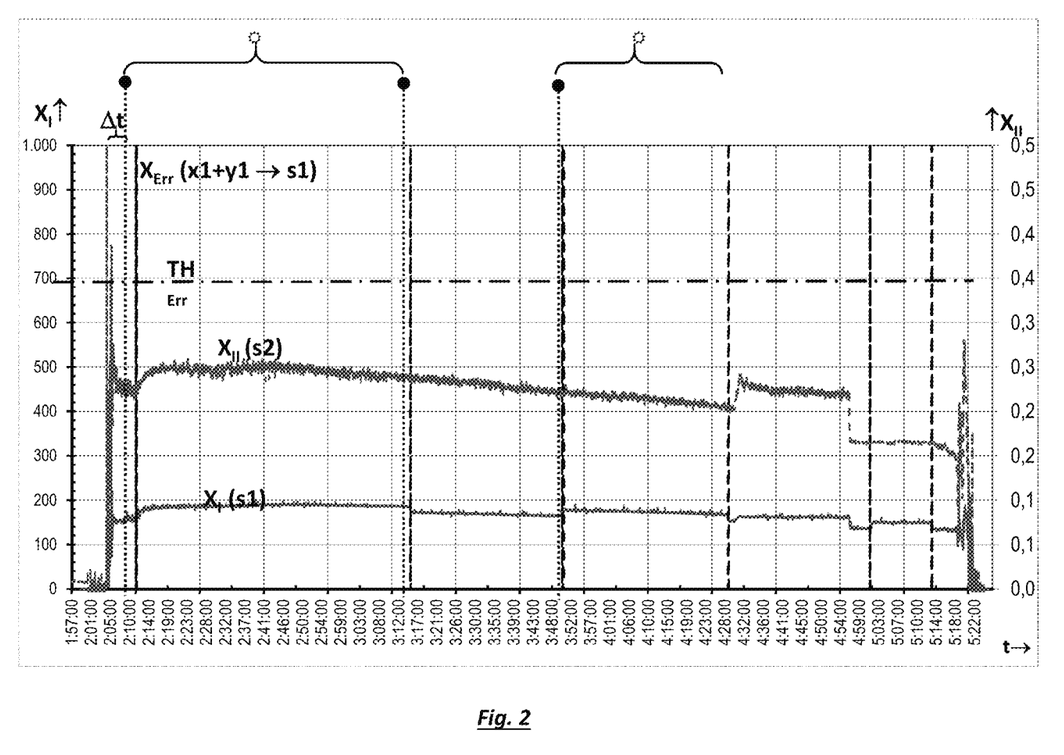
FIG. 2 shows measurement data (measured values) experimentally ascertained with a measuring device system of one of the FIGS. 1a, 1b, 1c and 1d and at times influenced by a disturbance.

As already mentioned, in the case of a measuring device system M1+M2, one of the at least two measurement signals s1, s2 delivered from the measuring devices M1, M2, for example, the measurement signal s1 delivered by the measuring device M1, can have a high sensitivity, especially increased compared with the other of the measurement signals, for example, the measurement signal s2, to a disturbing variable y1 corresponding to an (external) disturbance (☼) and independent of the primary measured variable; this, especially, in such a manner that its at least one (sensitive to the measured variable) signal parameter also follows with a corresponding temporal change a temporal change of the disturbing variable y1. As a result of such a disturbance (☼) of one of the measuring devices, an accuracy of measurement of the measured values won based on the measurement signal can be corrupted and, associated therewith, an ability of the total measuring device system M1+M2 to function can be degraded in considerable measure; this, in given cases, also such that the measured values generated therewith, for example, such as shown by way of example in FIG. 2 based on experimentally ascertained measurement data, measured values $X_I$ of first type won from the measurement signal s1, have an unacceptably high measurement error. In the case of the measurement system of the invention M1+M2, especially the measurement signal s1 delivered by the measuring device M1 is sensitive both to the measured variable x1 as well as also the disturbing variable y1, in such a manner that its first signal parameter follows with a temporal change both the temporal change $\Delta x1/\Delta t$ ($\Delta x1'/\Delta t$) of the primary measured variable x1 as well as also a temporal change $\Delta y1/\Delta t$ of the disturbing variable y1, especially one independent of the first measured variable x1. Disturbing variable y1 can be, particularly for the above-described case, in which the measuring device M1 is a Coriolis-mass flow-measuring device measuring mass flow, for example, an accretion on an inner wall of one or more tubes of the measuring device or a magnetic flux, or a magnetic flux density (B→y1), of an external magnetic field, namely a magnetic field closing outside of the measuring device M1, or caused by a magnet positioned outside of the measuring device. In an additional embodiment of the invention, the measuring device M2 is so selected in coordination with the sensitivity of the measuring device M1, or of the measurement signal s1, to the disturbing variable y1 that the measurement signal s2 generated by means of the measuring device M2 has a lower sensitivity to the disturbing variable y1 than the measurement signal s1; this, for example, in such a manner that the measurement signal s2 has no or only a negligibly small sensitivity to the disturbing variable y1, or that its signal parameter is independent of the disturbing variable y1.

For monitoring measuring device system M1+M2, especially for checking the ability of the measuring device system M1+M2 to function and/or for determining a possibly arising disturbance (☼) of the measuring device system M1+M2, according to the invention, firstly, an error characterizing number Err is ascertained, based both on measured values $X_I$ of first type as well as also based on measured values $X_{II}$ of second type, in such a manner that the error characterizing number Err represents a velocity error $\Delta X_I/\Delta X_{II}$ of the measuring device system M1+M2 caused by a change (dy1/dt→$\Delta y1/\Delta t$) of the disturbing variable y1, namely a difference between a rate of change $\Delta X_I/\Delta t$ of the measured values $X_I$ of first type and a simultaneous rate of change $\Delta X_{II}/\Delta t$ of the measured values $X_{II}$ of second type or ascertained at the same time. The ascertaining of the error characterizing number Err can occur in the case of the measurement system M1+M2 of the invention, for example, in one of the measuring devices M1, M2, e.g. one of their measuring device-electronics, for example, as well as also schematically shown in FIGS. 1a and 1d, in the measuring device M1 or in the measuring device M2 (FIG. 1b). The error characterizing number Err can, however, for example, also, such as shown, among others, in FIG. 1c, be generated first in the above described superordinated computer unit C10 based on measured values of first and second type ($X_I$, $X_{II}$) transmitted from the measuring device system M1+M2 to the computer unit C10. As evident, for instance, from FIG. 2, based on the above described velocity error $\Delta X_I/\Delta X_{II}$, thus based already on its magnitude, or on the subsequently ascertained error characterizing number, a disturbance can be detected very quickly and very reliably, in that, directly, significant changes of the measurement signal s1, e.g. its signal parameter, effected by its arrival (or disappearance) are evaluated.

In an additional embodiment of the invention, it is, furthermore, provided as a function of the ascertained error characterizing number Err to produce a report, for example, issued as an alarm, at least qualitatively showing the presence of the disturbance, or an extent of the disturbing variable y1. The report can, for example, be output on one of the measuring devices M1, M2 or on each of the measuring devices M1, M2, for example, made visually perceivable by means of a corresponding signal light (LED) and/or a display unit of a measuring device. Alternatively or supplementally, the report can also be transmitted as a corresponding report to the above-mentioned computer unit C10. The error characterizing number Err can, for example, be ascertained in such a manner that it quantifies the disturbing variable y1, or its influence on the measurement signal s1, namely shown in the form of correspondingly calculated, numerical values; this, for example, in such a manner, that the characterizing number is ascertained in the form of a dimensionless, characterizing number (characteristic variable) and/or that an error characterizing number Err having a high numerical value represents a (relevant) disturbance effecting a high measurement error and an error characterizing number Err having a comparatively lower numerical value represents a disturbance effecting a comparatively lower, in given cases, even negligible, measurement error, and that an increasing error characterizing number Err represents an increasing velocity error $\Delta X_I/\Delta X_{II}$. The error characterizing number Err can, for example, however, also be so ascertained that it represents the presence of a disturbing variable y1 having a predetermined, for example, superelevated and/or critical level, or that it signals an associated influence on the measurement signal s1 only qualitatively, for example, the exceeding of a predetermined threshold value. Accordingly, according to an additional embodiment of the invention, it is provided to ascertain the error characterizing number Err in that (firstly) at least one, especially digital, characterizing number value $X_{Err}$ quantifying the error characterizing number Err, or the velocity error, is calculated; this, for example, also recurringly and/or in such a manner that a number of characterizing number values following one after another in time are calculated. The at least one characterizing number value $X_{Err}$ of the error characterizing number Err can then, for example, be compared with a predetermined threshold value $TH_{Err}$, for example, a digital threshold value and/or one stored in the relevant measuring device-electronics, for example, a threshold value representing or quantifying a maximum allowable velocity error $X_{Err,max}$ of the measuring device system M1+M2 ($X_{Err,max} \rightarrow TH_{Err}$). For the case, in which the characterizing number value $X_{Err}$ exceeds or has exceeded the threshold value $TH_{Err}$, furthermore, the above-mentioned (error-) report can be correspondingly generated. In an additional embodiment of the invention, it is, furthermore, provided to output measured values $X_I$ of first type and/or measured values $X_{II}$ of second type as qualified measured values of the measuring device system as a function of the ascertained error characterizing number Err, for example, when the above-mentioned characterizing number value $X_{Err}$ has not exceeded the set threshold value $TH_{Err}$, or to prevent at least one output of measured values $X_I$ of first type as qualified measured values of the measuring device system as a function of the ascertained error characterizing number Err, in case namely the error characterizing number Err signals a too high measurement error for measured values $X_I$ of first type, or when the above-mentioned characterizing number value $X_{Err}$ has exceeded the set threshold value $TH_{Err}$. The characterizing number value $X_{Err}$ can, for example, be ascertained with the same updating rate as the measured values of first and second type.

In an additional embodiment of the invention, it is, furthermore, provided for the ascertaining of the error characterizing number $X_{Err}$ and for calculating one or more characterizing number values $X_{Err}$, firstly, to ascertain a measured value difference $\Delta X_I$ of first type, namely a difference between two measured values $X_I$ of first type ascertained over a predetermined time interval $\Delta t$ and one after another in time, and a measured value difference $\Delta X_{II}$ of second type, namely a difference $\Delta X_{II}$ of two measured values $X_{II}$ of second type ascertained over the time interval $\Delta t$ and one after another in time. Based on the measured value differences of first type and of second type, the error characterizing number $X_{Err}$ and the characterizing number values $X_{Err}$ can, for example, be calculated in that, firstly, there are ascertained both a rate of change $\Delta X_I/\Delta t$ of the measured values $X_I$ of first type from the measured value difference $\Delta X_I$ of first type and the predetermined time interval $\Delta t$, as well as also a rate of change $\Delta X_{II}/\Delta t$ of the measured values $X_{II}$ of second type from the measured value difference $\Delta X_I$ of first type and the predetermined time interval $\Delta t$, for example, in each case, as an instantaneous or an average rate of change, and thereafter a quotient is calculated from the rate of change $\Delta X_I/\Delta t$ of the measured values $X_I$ of first type and the rate of change $\Delta X_{II}/\Delta t$ of the measured values $X_{II}$ of second type. Alternatively or supplementally, the error characterizing number $X_{Err}$ and the characterizing number values $X_{Err}$ can be ascertained based on of the above described measured value differences $\Delta X_{II}$, $\Delta X_I$ of first and of second type very easily also by ascertaining, especially calculating, a corresponding quotient $\Delta X_I/\Delta X_{II}$ (difference quotient) from the measured value difference $\Delta X_I$ of first type and the measured value difference $\Delta X_{II}$ of second type.

The invention claimed is:

1. A method for monitoring a measuring device system formed using a first measuring device and a second measuring device, the method comprising:
   producing a first measurement signal using the first measuring device such that the first measurement signal has a first signal parameter, wherein a temporal change of a first primary measured variable or a temporal change of a disturbing variable independent of the first measured variable causes a temporal change in the first signal parameter of the first measurement signal;
   producing a second measurement signal using the second measuring device such that the second measurement signal has a first signal parameter, wherein a temporal change of a second primary measured variable causes a temporal change in the first signal parameter of the second measurement signal;
   calculating measured values of a first type representing the first primary measured variable or a first secondary measured variable dependent on the first primary measured variable and based on the first signal parameter of the first measurement signal;
   calculating measured values of a second type representing the second primary measured variable or a second secondary measured variable dependent on the second primary measured variable and based on the first signal parameter of the second measurement signal;
   calculating an error characterizing number using the measured values of the first type and the measured values of the second type, wherein the error characterizing number represents a velocity error of the measuring device system caused by a change of the disturbing variable,
   wherein the velocity error is a ratio of: a rate of change of the measured values of the first type to a rate of change of the measured values of the second type.

2. The method of claim 1, further comprising:
   producing a report that indicates, as a function of the calculated error characterizing number, an extent of the disturbing variable, and which is declared as an alarm.

3. The method of claim 1, further comprising:
   outputting the measured values of the first type and/or the measured values of the second type as qualified measured values of the measuring device system as a function of the error characterizing number; and/or
   preventing an output at least of the measured values of the first type as qualified measured values of the measuring device system as a function of the ascertained error characterizing number.

4. The method of claim 1, wherein calculating of the error characterizing number includes a calculating of at least one characterizing number value quantifying the error characterizing number in such a manner that an increasing error characterizing number represents an increasing velocity error.

5. The method of claim 1, further comprising:
   comparing the error characterizing number with a predetermined threshold value, wherein the predetermined threshold value represents a maximum allowable velocity error of the measuring device system; and
   producing a report when the error characterizing number exceeds, or has exceeded, the predetermined threshold value.

6. The method of claim 5, further comprising:
   outputting the measured values of the first type and/or the measured values of the second type as qualified measured values of the measuring device system when the error characterizing number has not exceeded the predetermined threshold value; and/or
   preventing output at least of the measured values of the first type as qualified measured values of the measuring device system when the error characterizing number has exceeded the predetermined threshold value.

7. The method of claim 1, wherein the calculating of the error characterizing number includes calculating a difference between two measured values of the first type ascertained following one after another in time over a predetermined time interval and calculating a difference between two measured values of the second type ascertained following one after another in time over the predetermined time interval.

8. The method of claim 7, wherein the calculating of the error characterizing number includes calculating a quotient of the measured value difference of the first type and the measured value difference of the second type.

9. The method of claim 7, wherein the calculating of the error characterizing number includes calculating both a rate of change of the measured values of the first type from the measured value difference of the first type and the predetermined time interval and a rate of change of the measured values of the second type from the measured value difference of the second type and the predetermined time interval.

10. The method of claim 1, wherein the calculating of the error characterizing number includes calculating a quotient of a rate of change of the measured values of the first type and a rate of change of the measured values of the second type.

11. The method of claim 1, wherein the first measuring device is a Coriolis mass flow-measuring device.

12. The method of claim 1, wherein the first measuring device is adapted to measure mass flow and/or a volume flow of a fluid flowing through the measuring device.

13. The method of claim 1, wherein the second measuring device is a pressure difference-measuring device.

14. The method of claim 1, wherein the second measuring device is adapted to measure a pressure difference within a fluid flowing through the measuring device and/or volume flow of the fluid.

15. The method of claim 1,
wherein the first primary measured variable is a mass flow of a fluid flowing through the first measuring device; and/or
wherein the first secondary measured variable is a volume flow of the fluid flowing through the first measuring device; and/or
wherein the second primary measured variable is a pressure difference within the fluid flowing through the second measuring device; and/or
wherein the second secondary measured variable is a volume flow of the fluid flowing through the second measuring device; and/or
wherein the disturbing variable is a magnetic flux, or a magnetic flux density, of a magnetic field within the first measuring device, or one caused by a magnet positioned outside of the first measuring device.

16. The method of claim 1, wherein the first measurement signal has a second signal parameter, wherein a temporal change of a third primary measured variable causes a temporal change in the second signal parameter of the first measurement signal.

17. The method of claim 16, further comprising:
calculating measured values of a third type representing the third primary measured variable based on the first measurement signal.

18. The method of claim 17, further comprising:
using the measured values of the third type for calculating the measured values of first type; and/or
using the measured values of the third type for calculating the measured values of the second type.

19. The method of claim 16, wherein the third primary measured variable is a density of a fluid flowing through the first measuring device.

20. The method of claim 1, further comprising:
using the first measuring device to produce a third measurement signal, which a first signal parameter, wherein the temporal change of the first primary measured variable and the temporal change of the disturbing variable causes a temporal change in the first signal parameter of the third measurement signal; and
calculating measured values of first type based also on the first signal parameter of the third measurement signal.

* * * * *